United States Patent [19]

Brucker

[11] Patent Number: 4,955,319

[45] Date of Patent: Sep. 11, 1990

[54] BIRD FEEDER

[75] Inventor: Robert J. Brucker, Bernardsville, N.J.

[73] Assignee: Seal Spout Corporation, Liberty Corner, N.J.

[21] Appl. No.: 256,742

[22] Filed: Oct. 12, 1988

[51] Int. Cl.⁵ .......................................... A01K 39/014
[52] U.S. Cl. .................................. 119/52.2; 119/57.8
[58] Field of Search ................... 119/52 R, 52 AF, 53, 119/53.5, 54

[56] References Cited

U.S. PATENT DOCUMENTS

| | | | |
|---|---|---|---|
| 643,350 | 2/1900 | Fearnaught | 119/52 R |
| 1,279,478 | 9/1918 | Stofer | 119/52 R |
| 1,378,533 | 5/1921 | Fitz Gerald | 119/52 R |
| 1,566,545 | 12/1925 | Larson | 119/52 R |
| 1,595,758 | 8/1926 | Collins | 119/54 |
| 2,556,661 | 6/1951 | Rendall et al. | 119/52 R |
| 2,943,600 | 7/1960 | Rosoff | 119/52 R |
| 3,372,676 | 3/1968 | Williams | 119/52 R |
| 4,144,842 | 3/1979 | Schlising | 119/52 R |
| 4,233,941 | 11/1980 | Webster | 119/52 R |
| 4,706,851 | 11/1987 | Hegedus et al. | 119/52 R X |
| 4,712,512 | 12/1987 | Schreib et al. | 119/52 R |

OTHER PUBLICATIONS

P. 112, Popular Mechanic's, Aug. 1945.

*Primary Examiner*—Paul J. Hirsch
*Attorney, Agent, or Firm*—Weingram & Zall

[57] ABSTRACT

The present invention relates to a bird feeder which is combined with a container for the bird food. The birdfeed container makes use of a spout, such as may be employed with the common salt dispenser, the spout being mounted for insertion and removal of the "bottom" of the birdfood container. A perch in the form of a dowel or stick is passed through holes in the wings of the spout to provide a perch for the feeding bird. The container may take the form of a closed container, such as normally found in the familiar salt dispenser.

10 Claims, 2 Drawing Sheets

BIRD FEEDER

BACKGROUND OF THE INVENTION

1. Field of the Invention

The present invention relates to a bird feeder of the type employing a closed container containing bird food with a spout formed at the bottom thereof. When the container is inverted, the spout forms a feeding station as well as an exit for the food. A pivot-stick is passed through holes in wings of the spout to act as a perch for the bird.

2. Discussion of the Prior Art

Tobias, U.S. Pat. No. 2,504,282, discloses a collapsible-type feeder having perches formed on the base of the feeder.

Stainbrook, U.S. Pat. No. 3,124,103, features a spout-type bird feeder but the arrangement of this feeder is complicated, requiring multiple moving parts and pivots to provide food to birds of appropriate size and weight.

Early, U.S. Pat. No. 2,775,226, teaches a paperboard feed container which can be converted into a bird feeder. A trough attachment is provided and the trough attachment forms a bird support and a spout feeding arrangement which can pivotally open and close by wings mounted on the sides of the container.

Kuhn, U.S. Pat. No. 3,179,244, combines a bird feed shipping container with a bird feed arrangement. The bird is provided with a stand which is inserted into the bottom of the container. Food is reached by an aperture formed in the container.

Dornbush, U.S. Pat. No. 3,478,948, teaches a dispensing container having a trough feeding bin.

Webster, U.S. Pat. No. 4,233,941, shows a bird feeder which forms a base supported by cantilevered wings against the feeding container. There is no spout shown in this patent as the bird food is exited to the feeding platform via an aperture in the bottom of the container.

Kerscher, U.S. Pat. No. 4,215,652, has a number of feed apertures and bird support bars mounted through a V-shaped feed hopper.

Kilham, U.S. Pat. No. 4,328,765, shows a feeding perch for birds where the perch is mounted on wings extending from a feeder container.

Dehls, U.S. Pat. No. 4,541,362, discloses a bird feeder where the feed station is designed to be selective to birds of a certain size and weight.

SUMMARY OF THE INVENTION

The present invention relates to a bird feeder which is combined with a container for the bird food. The birdfood container makes use of a spout, such as may be employed with the common salt dispenser, the spout being mounted for insertion and removal at the "bottom" of the birdfood container. A perch in the form of a dowel or stick is passed through holes in the wings of the spout to provide a perch for the feeding bird. The container may take the form of a closed container, such as normally found in the familiar salt dispenser.

A principal object of the present invention is to provide a combined bird feeder and birdfeed container.

A further object of the present invention is to provide a birdfeed container and bird feeder employing an openable spout which, combined with a dowel or stick, provides a perch for a feeding bird and a source for food to pass from the container to a feeding position.

Another object of the present invention is to provide a device for packaging bird food and for employing same as a bird feeder station, which device is simple and low in cost with relatively few parts.

The above as well as further objects and advantages of the invention will become apparent to those skilled in the art from a review of the accompanying drawings and a review of the detailed specification.

DETAILED DESCRIPTION OF THE PREFERRED EMBODIMENT

Figure 1:
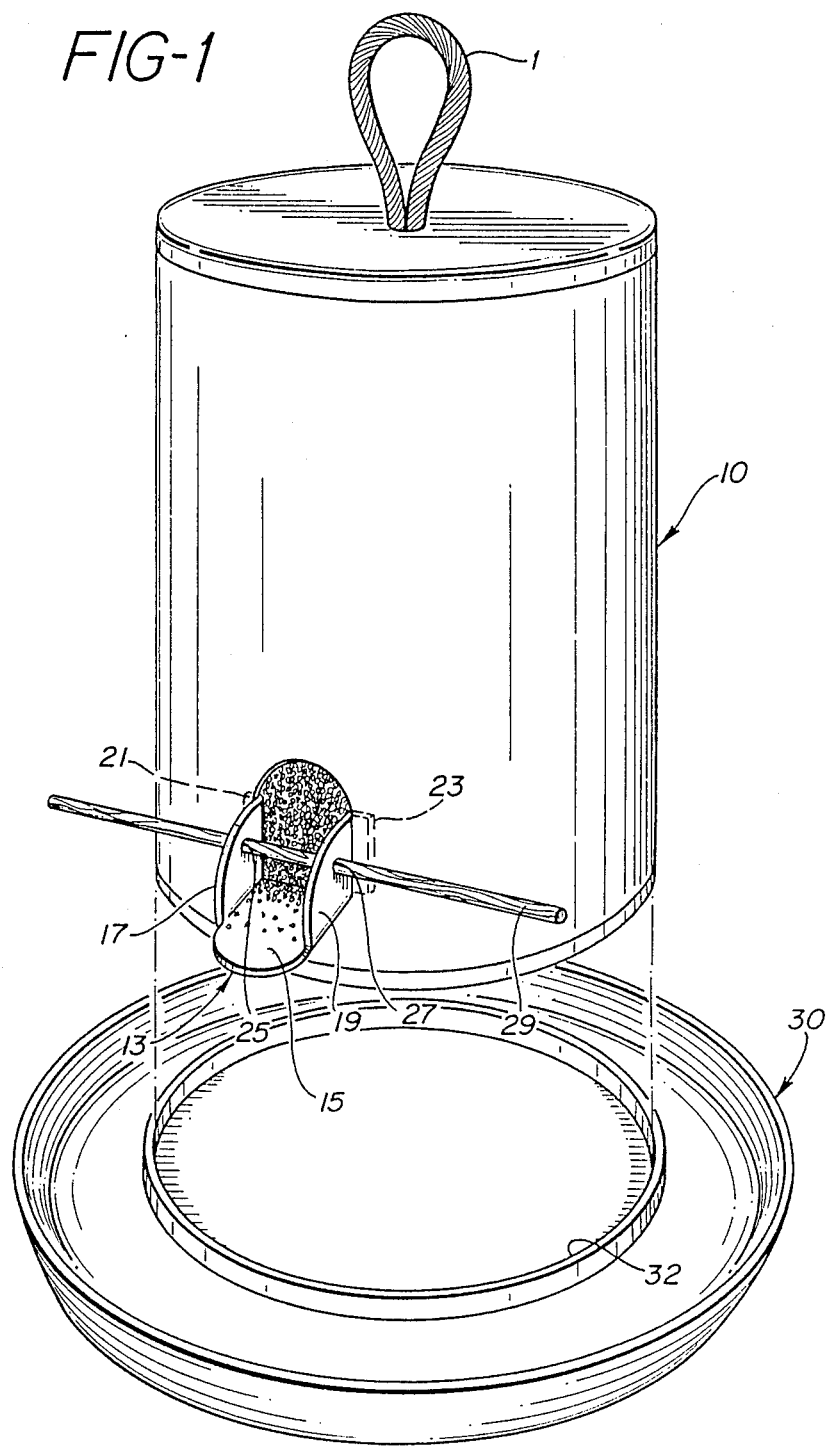
FIG. 1 is a perspective view of one embodiment of the birdfeed container and bird feeder of the invention.

In FIG. 1, the birdfood container is shown generally at 10 as a cylindrical container having completely closed top and bottom surfaces and an enclosed protective wall in the manner of the well-known containers for salt.

Affixed to side wall of the container at or near one end thereof is a spout 13. The spout 13 has a feed supporting surface 25 and two wings, 17 and 19, formed thereon. The rearward projections of the wings 17, 19 are shown at 21 and 23 respectively. These rearward projections are formed as bent tabs and are designed to cooperate with the interior of the container 10 to prevent the spout from tipping beyond the point where the tabs 21, 23 engage the interior wall of the container 10. Also formed in the wings 17, 19 are holes 25, 27. These holes are designed to interfit with a support perch which may be in the form of a dowel 21. As can now be seen, the spout 13 is "opened" allowing birdfood to pass from the container to surface 15 of the spout 13. The perch 29 may be inserted in holes 25, 27 to provide a mounting for the perch and a position on the feeder for the birds.

The perch may or may not be employed, however, as desired and the food simply allowed to collect on flat surface 15 of the spout 13 or allowed to spill from the spout 13 to another container 30.

Container 30 may take the form of a circular dish having a raised internal rim 32. The internal rim 32 is formed to interfit and be supported by the bottom of the cylindrical container 10. Thus, the dish 30 may be frictionally or adhesively engaged to the container 10. The dish can be employed to receive bird food in the trough between the internal rim 32 and the exterior rim of the dish 30. The exterior rim also serves as a perch surface for feeding birds. A hook 1 can also be provided to facilitate hanging of the feeder 10.

Figure 2:
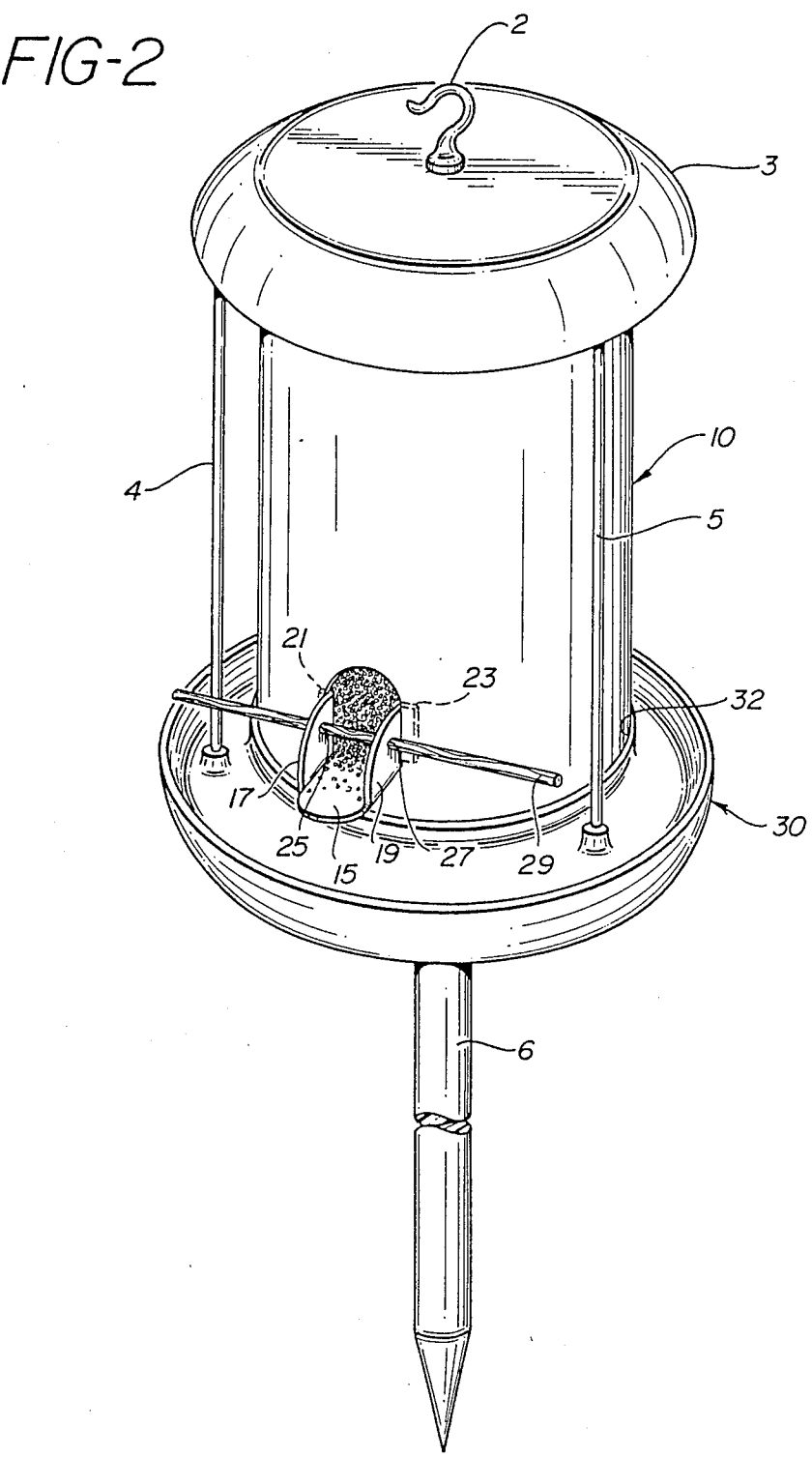
FIG. 2 is a perspective view of another embodiment of my invention.

FIG. 2 shows another embodiment of the birdfeeder of my invention. In FIG. 2, like numerals designate like parts in FIG. 1. As can be seen in FIG. 2, dish 30 employs both the internal rim 32 as discussed in connection with FIG. 1, and vertical support bars 4, 5. These support bars connect the dish 30 to a top cover 3. Cover 3 may take the same form as dish 30 except that it is employed in an inverted manner so as to provide a "roof" over the feeding positions on perch 29 and within dish 30. A hook 2 can be used to hang the feeder and/or a spike 6 can be used to secure the feeder from below dish 30.

Thus, the feeding package of the present invention combines a feeding station with a container for birdfood. However, the feeding portion may be bypassed altogether and food simply poured from the container to another birdfeeding location.

As variations to the foregoing may be made without departing from the spirit or scope thereof, it is intended that the protection afforded Applicant hereunder be in accordance with the accompanying claims.

I claim:

1. A container comprising:
    a body having closed bottom surface, top and side walls;
    spout means formed in said side walls;
    said spout means having apertures formed therein for supporting a perch means therein;
    feeding trough means attached to said bottom surface, said trough means comprising a feeding surface, internal rim means formed on said feeding surface for overfitting said bottom surface and external rim means formed on said feeding surface spaced from said internal rim means.

2. The container of claim 1, wherein said spout means includes:
    a supporting surface and two side wings coupled to said supporting surface;
    tabs means connected to said wings for positioning said spout means in its open position against said side walls; and
    said apertures formed in said wings for supporting said perch means therein.

3. The container of claim 1 further including a supporting protrusion formed on said bottom surface for supporting said container.

4. The container of claim 1 further including a cover means for overfitting said top, said cover means extending over and covering said trough means.

5. The container of claim 4 further including connecting means coupled between said cover means and said trough means for attaching and supporting said cover means and said trough means to said container.

6. The container of claim 1 further including hanging means connected to said top for enabling said container to be supported from said top surface.

7. A combined container and feeding apparatus comprising:
    a closed container for animal food;
    openable spout means formed in said container for allowing said food to pour from said container;
    said spout means including a bottom surface and two side wing supporting surfaces;
    means formed in said side wing supporting surfaces for forming a support for an animal to feed thereon directly from the container;
    said bottom surface being formed such that food for said animal may collect thereon;
    feeding trough means attached to said bottom surface, said trough means comprising a feeding surface, internal rim means formed on said feeding surface for overfitting said bottom surface and external rim means formed on said feeding surface spaced from said internal rim means.

8. A combined animal feed container and animal feeding station, comprising:
    a container having closed bottom, top and side wall surfaces;
    spout means coupled to and formed in said side wall surfaces, said spout means being pivotally mounted in said side wall surface between an open position and a closed position;
    said spout means including a spout surface for collecting and storing animal food thereon when said spout is in its open position;
    first and second support wings mounted to said spout support surface, said wings and said surface forming a trough for collecting animal food therein;
    tab means mounted to each of said wing supports, said tab means cooperating with said side wall surface to limit the movement of said spout in said open position;
    feeding trough means attached to said bottom surface, said trough means comprising a feeding surface, internal rim means formed on said feeding surface for overfitting said bottom surface and external rim means formed on said feeding surface spaced from said internal rim means.

9. The combined container and feeder of claim 8, further includes perch means mounted on said wing means for supporting an animal above said collected animal feed.

10. The combined container and feeder of claim 9, further including apertures formed in said wings, said apertures supporting said perch in said apertures.

* * * * *